United States Patent
Kawasaki (10) Patent No.: US 8,121,179 B2
(45) Date of Patent: Feb. 21, 2012

(54) WIRELESS RELAY DEVICE AND WIRELESS RELAY METHOD

(75) Inventor: Toshio Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 12/782,905

(22) Filed: May 19, 2010

(65) Prior Publication Data

US 2010/0303134 A1 Dec. 2, 2010

(30) Foreign Application Priority Data

May 27, 2009 (JP) .................................. 2009-127431

(51) Int. Cl.
*H04B 3/36* (2006.01)
*H04B 17/02* (2006.01)
*H04L 25/20* (2006.01)
*H04L 25/52* (2006.01)

(52) U.S. Cl. ........ 375/211; 375/260; 375/267; 375/299; 455/7; 370/203; 370/208

(58) Field of Classification Search .................. 375/211, 375/260, 267, 295, 299, 347; 455/7; 370/203–211
See application file for complete search history.

(56) References Cited

U.S. PATENT DOCUMENTS

| 2008/0227389 A1 | 9/2008 | Sakata et al. |
| 2009/0023469 A1* | 1/2009 | Tomioka et al. ........... 455/552.1 |

FOREIGN PATENT DOCUMENTS

| JP | 10-336159 | 12/1998 |
| JP | 2008-228201 | 9/2008 |

* cited by examiner

*Primary Examiner* — Curtis Odom
(74) *Attorney, Agent, or Firm* — Katten Muchin Rosenman LLP (57) ABSTRACT

A device and a process which enable use of transmission diversity in transmission to a receiving station when wirelessly relaying wireless signals from a transmitting station to the receiving station. A reception antenna RA in a wireless relay device (RS) receives from the transmitting station such as a base station (BS) a signal in which data signals are respectively allocated to carriers at adjacent radio frequencies. The wireless relay device performs space frequency block coding (SFBC) of the received signal. Then, the wireless relay device transmits SFBC-encoded signals through two transmission antennas SA0 and SA1 to the receiving station such as a mobile station (MS).

8 Claims, 10 Drawing Sheets

WIRELESS RELAY DEVICE AND WIRELESS RELAY METHOD

CROSS-REFERENCE TO RELATED APPLICATIONS

This application is based upon and claims the benefits of priority from the prior Japanese Patent Application No. 2009-127431, filed on May 27, 2009, the entire contents of which are incorporated herein by reference.

FIELD

The present invention relates to techniques for relaying wireless signals from a transmitting station such as a wireless base station to a receiving station such as a mobile station.

BACKGROUND

In the next-generation wireless communication systems in which high-speed transmission at the transmission rates of 100 Mbits/sec to 1 Gbits/sec is required, allocation of high-frequency bands is assumed. However, it is known that the signals in high-frequency bands generally exhibit strong straightness compared with the signals in low-frequency bands, so that many blind zones (to which radio waves do not reach) can occur. Therefore, the allocation of high-frequency bands reduces the cellular coverage (service area) in the case where the transmission power at the base station is identical to the transmission power in the wireless transmission systems currently in commercial use. The reduction in the cellular coverage is undesirable because the reduction in the cellular coverage leads to frequent occurrence of handovers as well as cost increase due to increase in the number of base stations.

In consideration of the above problem, a wireless communication system having a wireless relay device which relays wireless communication between a base station and mobile station has been proposed. Since the cost of the wireless relay device is generally lower than the cost of the base station, introduction of the wireless relay device enables securing of a sufficient coverage and realization of the entire system at low cost. The wireless communication system having a wireless relay device is currently studied in the IEEE 802.16j task group. The information under study is disclosed on IEEE 802.16 standard documents.

The diversity is known as a technique for securing quality of wireless communication in fading channel. In particular, the transmission diversity using two or more transmission antennas is currently used in the mobile communication systems since the receiving stations are not required to increase the number of antennas. However, conventionally the use of the transmission diversity in the wireless relay device has not been considered. If two transmission antennas are arranged in a wireless relay device for transmitting an identical signal to a receiving station through the two transmission antennas, signals which have passed through multiple paths are received by the receiving station, so that desired reception performance (reduction of the code error rate) which is expected with the transmission diversity cannot be achieved.

SUMMARY

Accordingly, it is an object in the following aspects of the invention to enable use of the transmission diversity when wireless signals transmitted from a transmitting station are relayed to a receiving station.

According to a first aspect of the invention, a wireless relay device for relaying wireless signals from a transmitting station to a receiving station is provided. The wireless relay device includes: a reception antenna; a first transmission antenna; a second transmission antenna; and an encoder. The reception antenna receives from the transmitting station a wireless signal that contains first and second wireless signal components in which a first data signal and a second data signal are respectively allocated to a carrier at a first radio frequency and a carrier at a second radio frequency adjacent to the first radio frequency along the frequency axis. The encoder generates first and second spectrum-reversed signals, the power spectra of which are symmetric respectively to those of the first and second data signals along the frequency axis. The encoder allocates a plurality of signals among the first data signal, the second data signal, the first and second spectrum-reversed signals, and polarity-inverted signals of the first and second spectrum-reversed signals to carriers at adjacent radio frequencies along the frequency axis so that space frequency block coding is applied using the first transmission antenna and the second transmission antenna.

According to a second aspect of the invention, a wireless relay device for relaying wireless signals from a transmitting station to a receiving station is provided. The wireless relay device includes: a reception antenna; a first transmission antenna; a second transmission antenna; and an encoder. The reception antenna receives from the transmitting station a wireless signal that contains: first and second wireless signal components in which a first data signal and a second data signal are respectively allocated to a carrier at a first radio frequency and a carrier at a second radio frequency adjacent to the first radio frequency along the frequency axis; a third wireless signal component in which a third data signal as a polarity-inverted signal of the second data signal is allocated to a carrier at a third radio frequency located at a position symmetric to the first radio frequency along the frequency axis with respect to a predetermined center frequency; and a fourth wireless signal component in which a fourth data signal identical to the first data signal is allocated to a carrier at a fourth radio frequency located at a position symmetric to the second radio frequency along the frequency axis with respect to the predetermined center frequency. The encoder generates first, second, third, and fourth spectrum-reversed signals, the power spectra of which are symmetric respectively to those of the first, second, third, and fourth data signals along the frequency axis. The encoder allocates each of the first, second, third and fourth spectrum-reversed signals to a carrier at a radio frequency located at a position symmetric, along the frequency axis with respect to the predetermined center frequency, to a radio frequency to which a data signal corresponding to the each of the first, second, third and fourth spectrum-reversed signals is allocated in the received wireless signal so that space frequency block coding is applied using the first transmission antenna and the second transmission antenna.

According to a third aspect of the invention, a wireless relay method for relaying wireless signals from a transmitting station to a receiving station is provided.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWINGS

Referring now to the attached drawings which form a part of this original disclosure.

DESCRIPTION OF EMBODIMENTS

Hereinbelow, the wireless relay devices according to the embodiments of the present invention are explained in detail.

1. First Embodiment 1.1 Wireless Communication System

First, the configuration of a wireless communication system containing a wireless relay device according to the first embodiment is briefly explained with reference to FIG. 1. In the wireless communication system of FIG. 1, the wireless relay device according to the first embodiment as a relay station (RS) relays wireless signals from a base station (BS) as a transmitting station to a mobile station (MS) as a receiving station. The wireless relay device according to the first embodiment comprises a reception antenna RA and two transmission antennas SA0 and SA1, and the transmission diversity is used in transmission from the wireless relay device to the mobile station.

In addition, the channel characteristic between an antenna (not shown) in a transmitting station and the reception antenna RA in the wireless relay device is denoted by $h_0$, the channel characteristic between the transmission antenna SA0 in the wireless relay device and an antenna (not shown) in the mobile station is denoted by $h_1$, and the channel characteristic between the transmission antenna SA1 in the wireless relay device and an antenna (not shown) in the mobile station is denoted by $h_2$. In the following explanations, the wireless communication systems in all the embodiments are assumed to have the same configuration as FIG. 1.

Figure 1:
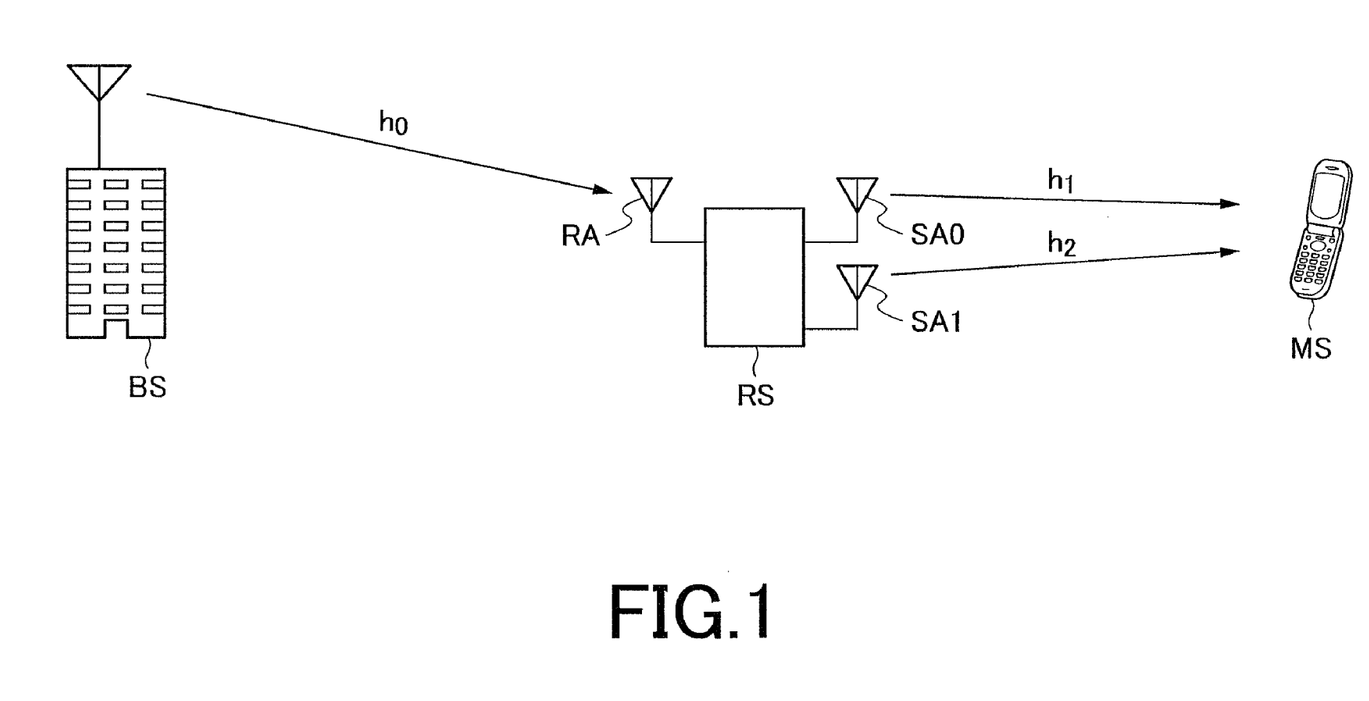
FIG. 1 is a diagram briefly illustrating a configuration of a wireless communication system containing a wireless relay device according to a first embodiment.

Further, the wireless communication system of FIG. 1 is assumed to divide a frequency resource allocated to the wireless communication system into a plurality of frequency bands, and use the frequency resource by FDM (frequency division multiplexing).

1.2 Transmission Diversity

Figure 2:
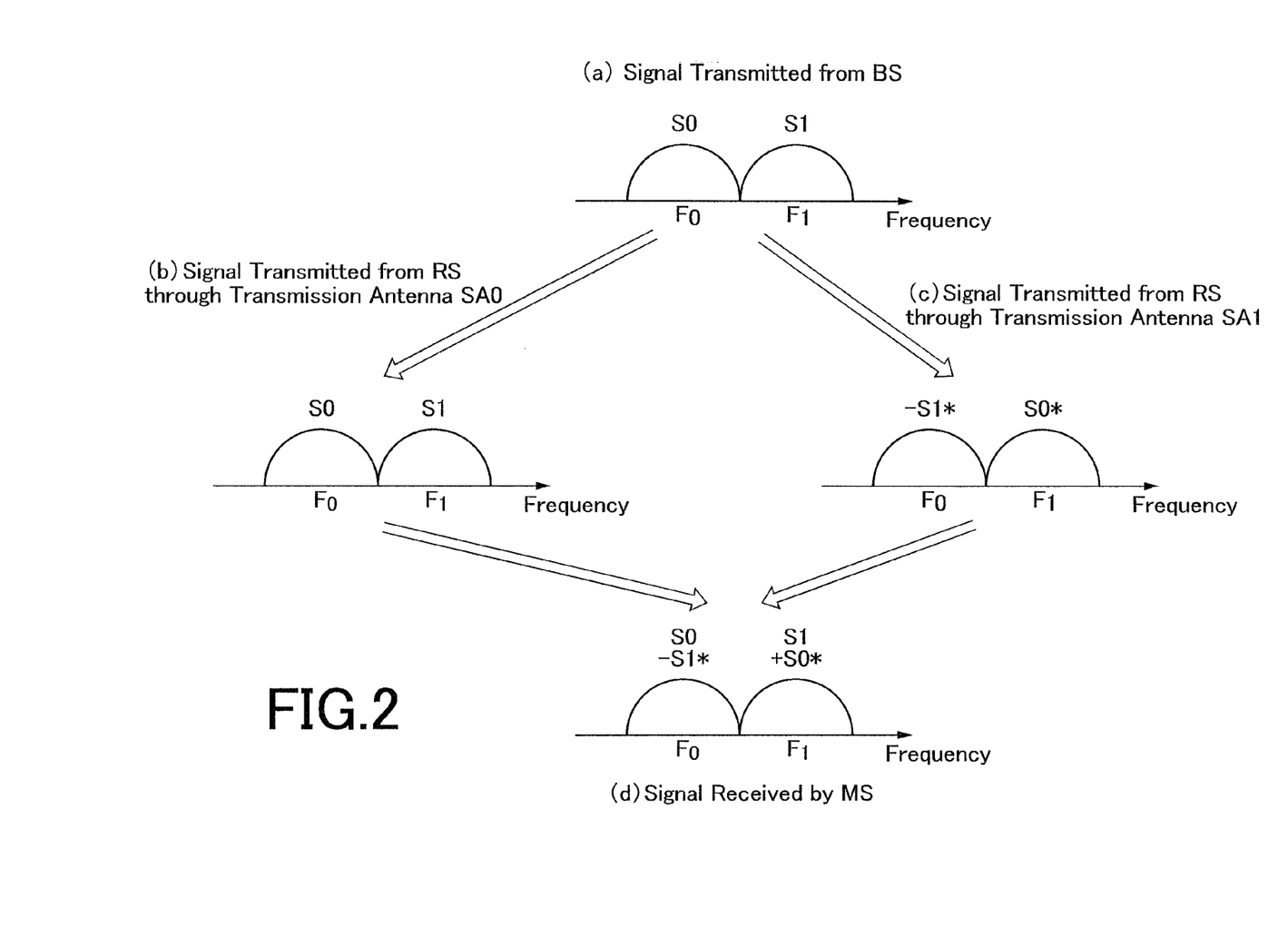
FIG. 2 is a diagram illustrating the principle of the transmission diversity according to the first embodiment.

Next, the transmission diversity used in transmission from the wireless relay device to the mobile station in the wireless communication system is explained with reference to FIG. 2, which illustrates the transmission diversity according to the present embodiment. In the wireless communication system according to the present embodiment, transmission with the transmission diversity using SFBC (space frequency block coding) is performed.

As illustrated below the caption "(a) Signal Transmitted from BS" in FIG. 2, a wireless signal in which data signals (or signals representing data symbols) S0 (first data signal) and S1 (second data signal) are respectively allocated to carriers at adjacent radio frequencies $F_0$ and $F_1$, is transmitted from the base station, and received by the reception antenna RA in the wireless relay device. The received wireless signal undergoes SFBC encoding in the wireless relay device. Specifically, the wireless relay device performs processing for changing the carriers allocated for the data signals S0 and S1, processing for calculating the complex conjugates of the data signals S0 and S1, and processing for inverting the polarity of a data signal, so that data signals −S1* and S0* are allocated to the carriers at the radio frequencies $F_0$ and $F_1$, where the asterisk * means the complex conjugate of the original signal. Then, a wireless signal in which the data signals −S1* and S0* are allocated to the carriers at the radio frequencies $F_0$ and $F_1$ is transmitted through the transmission antenna SA1 to the mobile station as illustrated below the caption "(c) Signal Transmitted from RS through Transmission Antenna SA1" in FIG. 2. In addition, the wireless signal received by the wireless relay device is transmitted as is, through the transmission antenna SA0 to the mobile station as illustrated below the caption "(b) Signal Transmitted from RS through Transmission Antenna SA0" in FIG. 2. The wireless signals transmitted through the transmission antennas SA0 and SA1 are combined in the air, so that the wireless signal as illustrated above the caption "(d) Signal Received by MS" in FIG. 2 is received by the mobile station. That is, the mobile station receives the data signals (S0, −S1*) from the carrier at the radio frequency $F_0$, and the data signals (S1, +S0*) from the carrier at the radio frequency $F_1$.

In the calculation of the complex conjugate, the polarity of the imaginary part (Q component) of each signal to be processed, which is a complex signal, is inverted, i.e., the imaginary part of each signal to be processed is multiplied by −1. The calculation of the complex conjugate is performed for reversing the power spectrum of the signal to be processed. (Hereinafter, the term "power spectrum" may be referred to as "spectrum.") Alternatively, in the spectrum reversal processing, the polarity of the real part (I component) may be inverted, or the real part (I component) and the imaginary part (Q component) may be exchanged.

When the signals received by the mobile station from the carriers at the radio frequencies $F_0$ and $F_1$ are respectively denoted by r(0) and r(1), the received signals r(0) and r(1) can be expressed by the following equations (1) using the channel characteristics $h_0$ to $h_2$ indicated in FIG. 1.

$$r(0) = (h_0 \cdot h_1) s_0 - (h_0 \cdot h_2) s_1^*$$

$$r(1) = (h_0 \cdot h_1) s_1 + (h_0 \cdot h_2) s_0^* \qquad (1)$$

On the premise that the channel characteristics of the channels from the wireless relay device to the mobile station at the adjacent radio frequencies are approximately equal, the signals received by the mobile station and indicated by the equations (1) undergo processing for SFBC decoding, so that the data signals S0 and S1 are separated by the mobile station as indicated in the equations (2).

$$\tilde{S}_0 = (|h_0 \cdot h_1|^2 + |h_0 \cdot h_2|^2) s_0$$

$$\tilde{S}_1 = (|h_0 \cdot h_1|^2 + |h_0 \cdot h_2|^2) s_1 \quad (2)$$

Although the data signals −S1* and S0* are allocated to the carriers at the radio frequencies $F_0$ and $F_1$ by the above example of SFBC encoding, alternatively, the data signals S1* and −S0* may be allocated to the carriers at the radio frequencies $F_0$ and $F_1$. That is, the polarity inversion may be performed on S0* instead of S1*.

1.3 Arrangement of Wireless Relay Device

Figure 3:
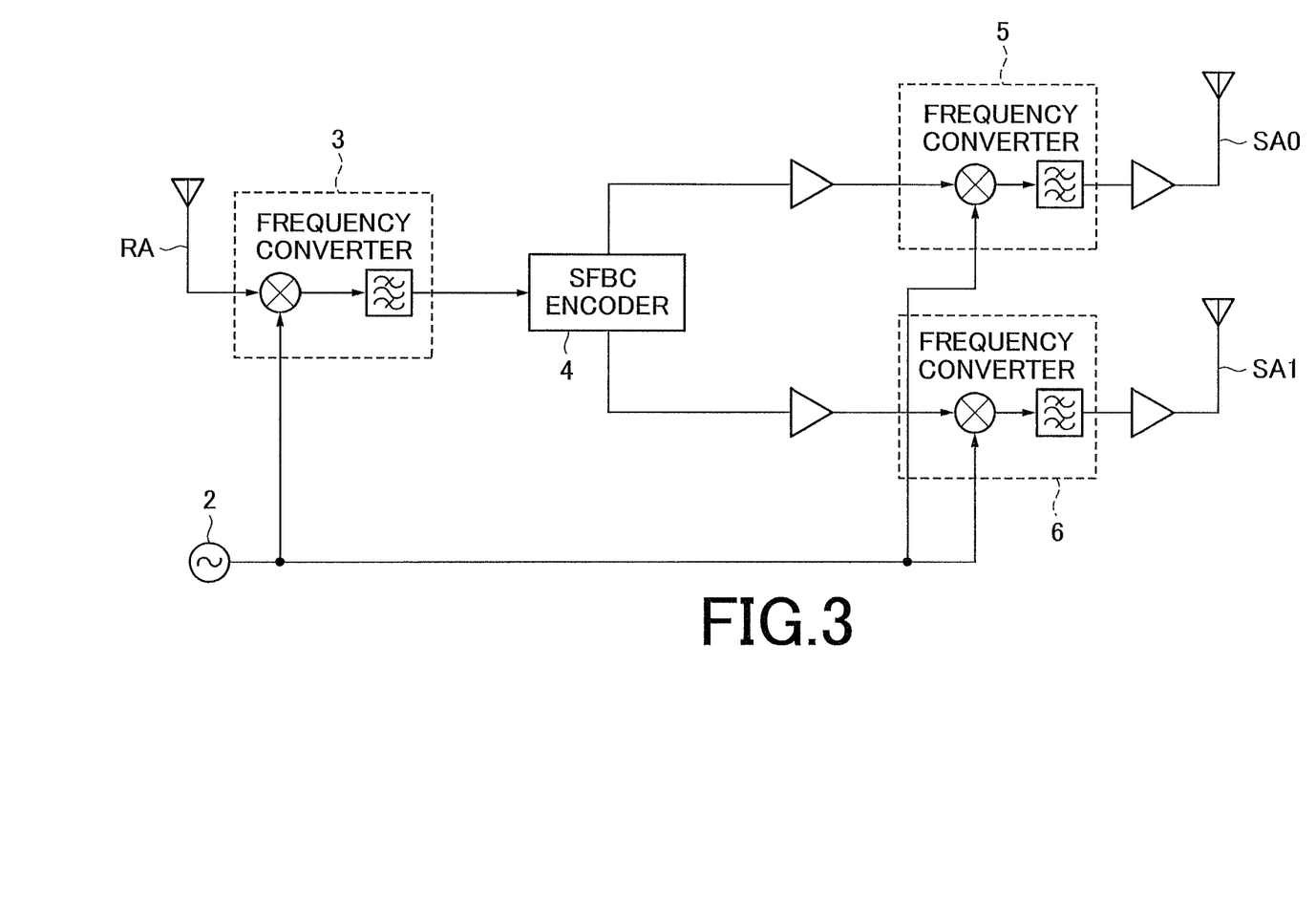
FIG. 3 is a block diagram illustrating an outline of an arrangement of a wireless relay device according to the first embodiment.

The arrangement of the wireless relay device for realizing the transmission diversity by using the SFBC encoding (illustrated in FIG. 2) is explained below with reference to FIGS. 3 and 4. FIG. 3 illustrates an outline of the arrangement of the wireless relay device according to the first embodiment, and FIG. 4 illustrates details of the arrangement of the wireless relay device.

As illustrated in FIG. 3, the wireless relay device comprises the reception antenna RA, a local oscillator 2, frequency converters 3, 5, and 6, an SFBC encoder 4 (encoder), and the transmission antennas SA0 and SA1. In FIG. 3, the frequency converter 3 performs quadrature detection on the wireless signal received from the base station through the receiver antenna RA, by use of a signal from the local oscillator 2, and downconverts the wireless signal into baseband signals or signals having an intermediate frequency (IF). The SFBC encoder 4 performs SFBC encoding of the baseband signals or the signals having the above intermediate frequency (IF), and produces encoded signals. The frequency converters 5 and 6 upconvert the encoded signals into radio frequency bands by use of the signal from the local oscillator 2, and the upconverted signals are transmitted through the transmission antennas SA0 and SA1 to the mobile station.

Figure 4:
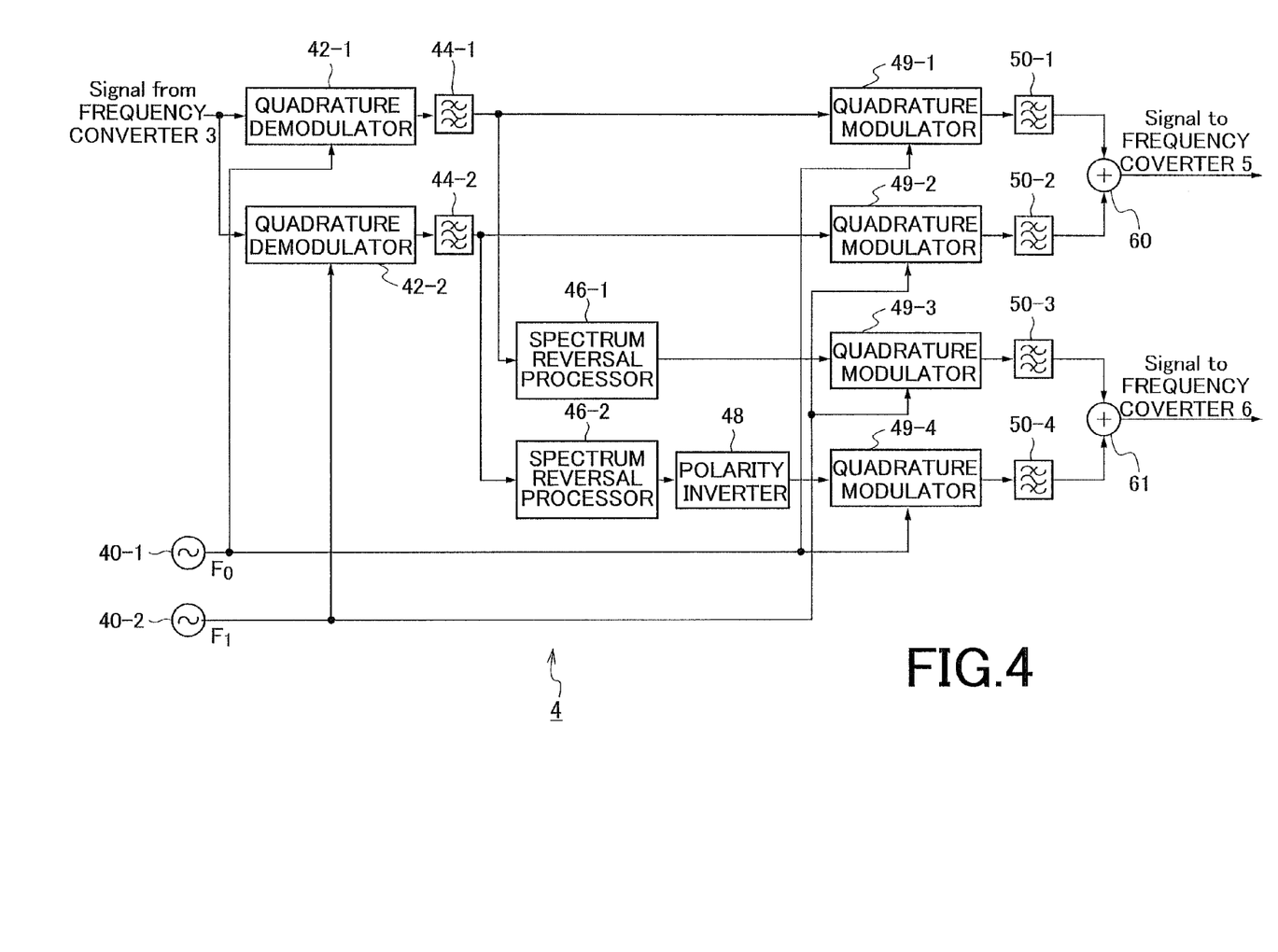
FIG. 4 is a block diagram illustrating details of an arrangement of a SFBC encoder in the wireless relay device according to the first embodiment.

Specifically, as illustrated in FIG. 4, the SFBC encoder 4 in the wireless relay device according to the first embodiment comprises local oscillators 40-1 and 40-2, quadrature demodulators 42-1 and 42-2, filters 44-1 and 44-2, spectrum reversal processors 46-1 and 46-2, a polarity inverter 48, quadrature modulators 49-1 to 49-4, filters 50-1 to 50-4, and signal combiners 60 and 61.

The quadrature demodulators 42-1 and 42-2 perform quadrature detection on the baseband signals or the signals having the above intermediate frequency (IF) received from the frequency converter 3, by use of the carriers at radio frequencies $F_0$ and $F_1$ (which are respectively generated by the local oscillators 40-1 and 40-2), and the filters 44-1 and 44-2 remove undesired components from the quadrature-detected signals, so that the data signals S0 and S1 are extracted. Thereafter, the quadrature modulators 49-1 and 49-2 respectively perform quadrature modulation of the data signals S0 and S1 by use of the carriers at the radio frequencies $F_0$ and $F_1$, and the filters 50-1 and 50-2 remove undesired components from the quadrature-modulated signals. Then, the signal combiner 60 performs combining of the quadrature-modulated signals, and the combined signal is sent to the frequency converter 5.

In FIG. 4, the data signals S0 and S1 extracted by the filters 44-1 and 44-2 are also inputted into the spectrum reversal processors 46-1 and 46-2, respectively. Each of the spectrum reversal processors 46-1 and 46-2 performs an operation of inverting the polarity of the I component or the Q component of each input symbol, or an operation of exchanging the I component and the Q component of each input symbol, so that the spectrum reversal processors 46-1 and 46-2 generate the complex conjugates S0* and S1* of the data signals S0 and S1. Further, the polarity inverter 48 inverts the polarity of the data signal S1*. Then, the quadrature modulators 49-3 and 49-4 respectively perform quadrature modulation of the data signals S0* and −S1* produced as above by use of the carriers at the radio frequencies $F_0$ and $F_1$, and the filters 50-3 and 50-4 remove undesired components from the quadrature-modulated signals. Thereafter, the signal combiner 61 performs combining of the quadrature-modulated signals, and the combined signal is sent to the frequency converter 6.

As explained above, the wireless relay device according to the first embodiment is provided with the two transmission antennas, and configured to downconvert the wireless signal (which is received from the base station and in which the data signals are allocated to the carriers at adjacent radio frequencies) into baseband signals, perform SFBC encoding, upconvert the SFBC-encoded signals into wireless signals in which the SFBC-encoded signals are allocated to the carriers at adjacent radio frequencies, and transmit to the mobile station the wireless signals corresponding to the SFBC-encoded signals. Therefore, the transmission diversity is realized in the transmission from the wireless relay device to the receiving station (the mobile station in this case). Therefore, it becomes possible to expect improvement in the code error rate in the transmission from the wireless relay device to the receiving station.

2. Second Embodiment

Next, the wireless relay device according to the second embodiment of the present invention is explained below. The transmission diversity using SFBC encoding is also realized in the wireless communication system having the wireless relay device according to the second embodiment.

2.1 Transmission Diversity

First, the transmission diversity used in the wireless relay device according to the second embodiment is explained with reference to FIG. 5, which illustrates the transmission diversity according to the second embodiment.

Figure 5:
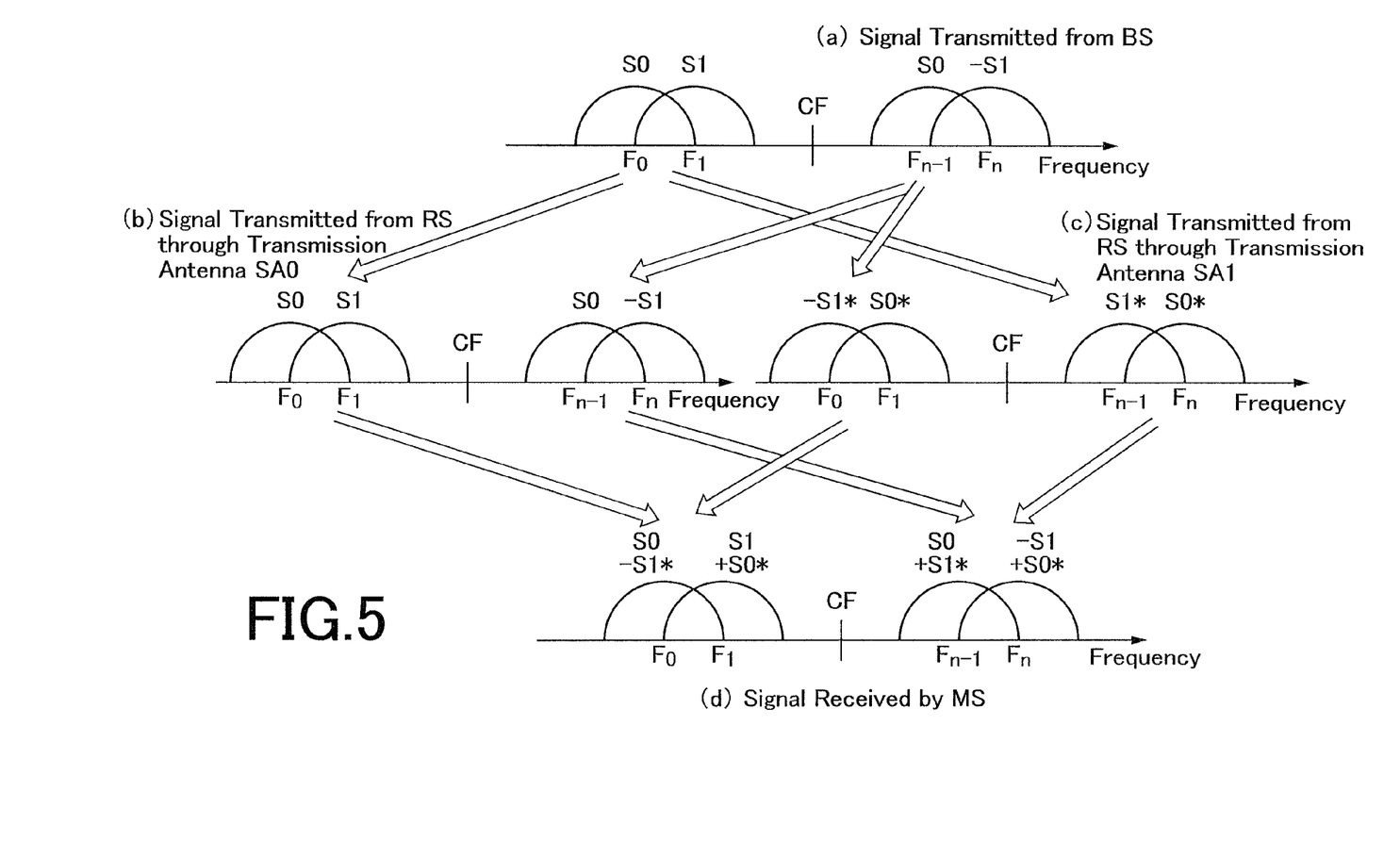
FIG. 5 is a diagram illustrating the principle of the transmission diversity according to a second embodiment.

In the wireless communication system according to the second embodiment of the present embodiment, a wireless signal which is transmitted from the base station to the wireless relay device and in which data signals (or signals representing data symbols) are allocated to the carriers at the adjacent radio frequencies $F_0$ and $F_1$ as illustrated below the caption "(a) Signal Transmitted from BS" in FIG. 5 is received through the reception antenna RA. That is, the data signals S0 and S1 are respectively allocated to the carriers at first and second radio frequencies $F_0$ and $F_1$, and the data signals −S1 and S0 are respectively allocated to the carriers at third and fourth radio frequencies $F_n$ and $F_{n-1}$, in the wireless signal transmitted from the base station, where the first and second radio frequencies $F_0$ and $F_1$ are located at adjacent positions along the frequency axis, the third and fourth radio frequencies $F_n$ and $F_{n-1}$ are located at adjacent positions along the frequency axis, and the third and fourth radio frequencies $F_n$ and $F_{n-1}$ are located at the positions, along the frequency axis, respectively symmetric to the first and second radio frequencies $F_0$ and $F_1$ with respect to a predetermined center frequency (indicated by CF in FIG. 5). The received wireless signal undergoes SFBC encoding in the wireless relay device.

That is, the wireless relay device downconverts the data signals allocated to the carriers at the radio frequencies $F_0$, $F_1$, $F_n$, and $F_{n-1}$ into frequency bands having lower frequencies than the radio frequency bands, respectively, and generates signals having spectra reversed from the downconverted signals and frequencies identical to the downconverted signals. Thus, after upconversion, a wireless signal having a spectrum symmetric to the received wireless signal with respect to the center frequency is generated.

In this example, as illustrated below the caption "(c) Signal Transmitted from RS through Antenna SA1" in FIG. 5, the data signal S0* (i.e., the complex conjugate of the data signal S0) is generated in correspondence with the data signal S0 (which is allocated to the carrier at the radio frequency $F_0$ in the received wireless signal) for being allocated to the carrier at the radio frequency $F_n$ (which is located at the position, along the frequency axis, symmetric to the radio frequency $F_0$ with respect to the center frequency CF). In addition, the data signal S1* (i.e., the complex conjugate of the data signal S1) is generated in correspondence with the data signal S1 (which is allocated to the carrier at the radio frequency $F_1$ in the received wireless signal) for being allocated to the carrier at the radio frequency $F_{n-1}$ (which is located at the position, along the frequency axis, symmetric to the radio frequency $F_1$ with respect to the center frequency CF). Further, the data signal S0* is generated in correspondence with the data signal S0 (which is allocated to the carrier at the radio frequency $F_{n-1}$ in the received wireless signal) for being allocated to the carrier at the radio frequency $F_1$ (which is located at the position, along the frequency axis, symmetric to the radio frequency $F_{n-1}$ with respect to the center frequency CF). Furthermore, the data signal −S1* is generated in correspondence with the data signal −S1 (which is allocated to the carrier at the radio frequency $F_n$ in the received wireless signal) for being allocated to the carrier at the radio frequency $F_0$ (which is located at the position, along the frequency axis, symmetric to the radio frequency $F_n$ with respect to the center frequency CF).

As described above, a wireless signal in which the data signals −S1*, S0*, S1*, and S0* are allocated to the carriers at the radio frequencies $F_0$, $F_1$, $F_n$, and $F_{n-1}$ is transmitted through the transmission antenna SA1 to the mobile station. On the other hand, as illustrated below the caption "(b) Signal Transmitted from RS through Antenna SA0" in FIG. 5, the wireless signal which is received by the wireless relay device and in which the data signals S0, S1, S0, and −S1 are allocated to the carriers at the radio frequencies $F_0$, $F_1$, $F_n$, and $F_{n-1}$ is transmitted as is through the transmission antenna SA0 to the mobile station. The wireless signals transmitted through the transmission antennas SA0 and SA1 are combined in the air, so that the wireless signal as illustrated above the caption "(d) Signal Received by MS" in FIG. 5 is received by the mobile station. Each of the pair of the data signals allocated to the carriers at the radio frequencies $F_0$ and $F_1$ in the wireless signal received by the mobile station and the pair of the data signals allocated to the carriers at the radio frequencies $F_n$ and $F_{n-1}$ in the received wireless signal is SFBC decoded in the mobile station.

Although the data signal −S1 (the polarity-inverted signal of the data signal S1) and the data signal S0 are respectively allocated to the carriers at the radio frequencies $F_n$ and $F_{n-1}$ in the wireless signal transmitted from the base station in the example of FIG. 5, alternatively, the data signals S1 and −S0 may be allocated to the carriers at the radio frequencies $F_n$ and $F_{n-1}$. That is, the polarity of the data signal S0, instead of the data signal S1, may be inverted in the wireless signal transmitted from the base station.

2.2 Arrangement of Wireless Relay Device

The arrangement of the wireless relay device for realizing the transmission diversity by using the SFBC encoding (as illustrated in FIG. 5) is explained below with reference to FIG. 6, which illustrates details of the arrangement of the wireless relay device according to the second embodiment.

Figure 6:
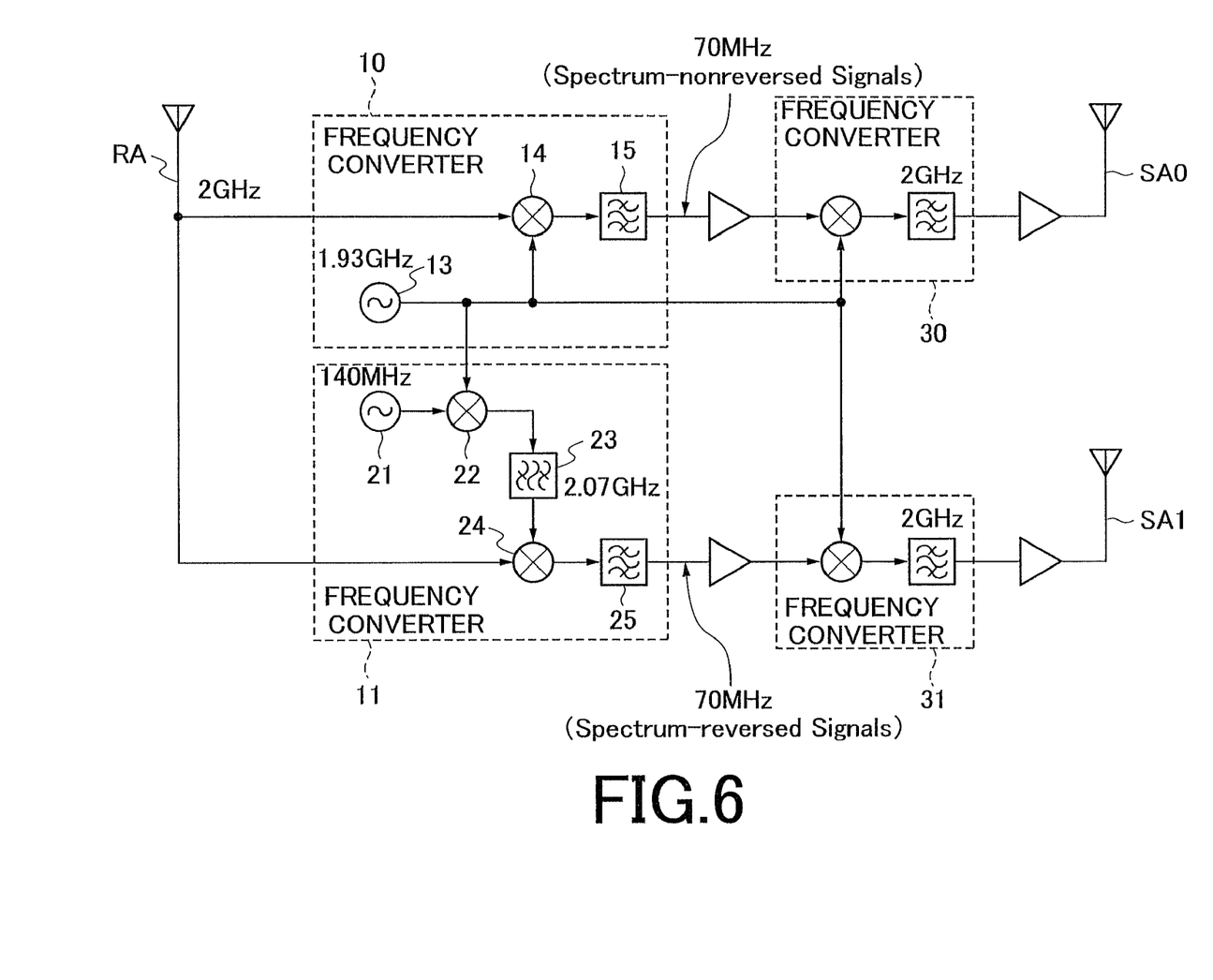
FIG. 6 is a block diagram illustrating a general arrangement of a wireless relay device according to the second embodiment.

As illustrated in FIG. 6, the wireless relay device according to the second embodiment comprises the reception antenna RA, first, second, third, and fourth frequency converters 10, 11, 30, and 31. In FIG. 6, the center frequency of the wireless signal received from the base station (i.e., the center value of the radio frequencies of the plurality of carriers) is assumed to be 2 MHz as an example, and the first and second frequency converters 10 and 11 contain the functions of an encoder.

The first frequency converter 10 contains a local oscillator 13, a mixer 14, and a filter 15. The local oscillator 13 generates a signal at an intermediate frequency, which is 1.93 GHz in the example of FIG. 6. In the first frequency converter 10, only the signals having frequencies corresponding to the difference between the frequencies of the received wireless signal and the intermediate frequency are extracted by the filter 15 from the modulated signals outputted from the mixer 14. In the example of FIG. 6, the signals extracted by the filter 15 belong to the 70 MHz band. Since the frequencies of the received wireless signal are higher than the intermediate frequency, the signals outputted from the filter 15 have non-reversed spectra in the 70 MHz band.

The second frequency converter 11 comprises a local oscillator 21, mixers 22 and 24, and filters 23 and 25. The local oscillator 21, the mixer 22, and the filter 23 are arranged for generating a signal having frequencies higher than the frequencies of the received wireless signal. The frequency of the signal outputted from the local oscillator 21 is set at 140 MHz. Only the signal having the frequency corresponding to the sum of the intermediate frequency and the frequency of the signal outputted from the local oscillator 21 (which is the signal at the frequency of 2.07 GHz in this example) is extracted by the filter 23 from the frequency-converted signals outputted from the mixer 22.

Further, only the signals having frequencies corresponding to the difference between the frequencies of the received wireless signal and the intermediate frequency are extracted by the filter 25 from the modulated signals outputted from the mixer 24. In the example of FIG. 6, the signals extracted by the filter 25 belong to the −70 MHz band. The complex signal having negative frequencies (e.g., in the −70 MHz band) is a real signal having a spectrum reversed from a spectrum of a real signal having positive frequencies (e.g., in the +70 MHz band). That is, the signals extracted by the filter 25 are spectrum-reversed signals in the 70 MHz band.

In FIG. 6, the third and fourth frequency converters 30 and 31 respectively upconvert the spectrum-nonreversed signals and the spectrum-reversed signals in the 70 MHz band into wireless signals each having the center frequency of 2 GHz. Thus, the frequencies of the carriers to which the wireless signal transmitted from the transmission antennas SA0 is allocated are symmetric, with respect to the center frequency, to the frequencies of the carriers to which the wireless signal transmitted from the transmission antennas SA1 is allocated, and the wireless signal transmitted from the transmission antennas SA0 has a spectrum symmetric, with respect to the center frequency, to the spectrum which the wireless signal transmitted from the transmission antennas SA1 has.

As explained above, the wireless relay device according to the second embodiment has two transmission antennas, receives from the base station as the transmitting station a wireless signal in which data signals are allocated to a plurality of carriers at radio frequencies symmetric with respect to the center frequency, and generates a wireless signal in which the spectrum-reversed signal of each of the data signals is allocated to a carrier at a frequency symmetric, with respect to the center frequency, to the frequency of the carrier to which the data signal is originally allocated in the received wireless signal. In addition, in order to realize SFBC encoding, the wireless relay device transmits to the mobile station the received wireless signal and the generated wireless signal through the two transmission antennas, respectively, so that transmission diversity is realized in the transmission from the wireless relay device to the receiving station (the mobile station in this case), and improvement in the code error rate in the transmission from the wireless relay device to the receiving station is achieved.

Although the exemplary values of the frequencies are indicated in the above explanations on the second embodiment with reference to FIG. 6, the values of the frequencies may be changed when necessary. Generally, when the center frequency of the received wireless signal is denoted by X [Hz], and the frequency of the signal generated by the local oscillator 13 is denoted by Y [Hz], it is sufficient to set the local oscillator 21 to generate the frequency of 2(X−Y) [Hz]. At this time, the frequency of the signal inputted by the filter 23 to the mixer 24 is equal to 2X−Y [Hz].

3. Third Embodiment

Next, the wireless relay device according to the third embodiment of the present invention is explained below with reference to FIG. 7. Although the transmission diversity using SFBC encoding is also realized in the third embodiment in a similar manner to the second embodiment, the wireless relay device according to the third embodiment is different from the second embodiment illustrated in FIG. 6.

Figure 7:
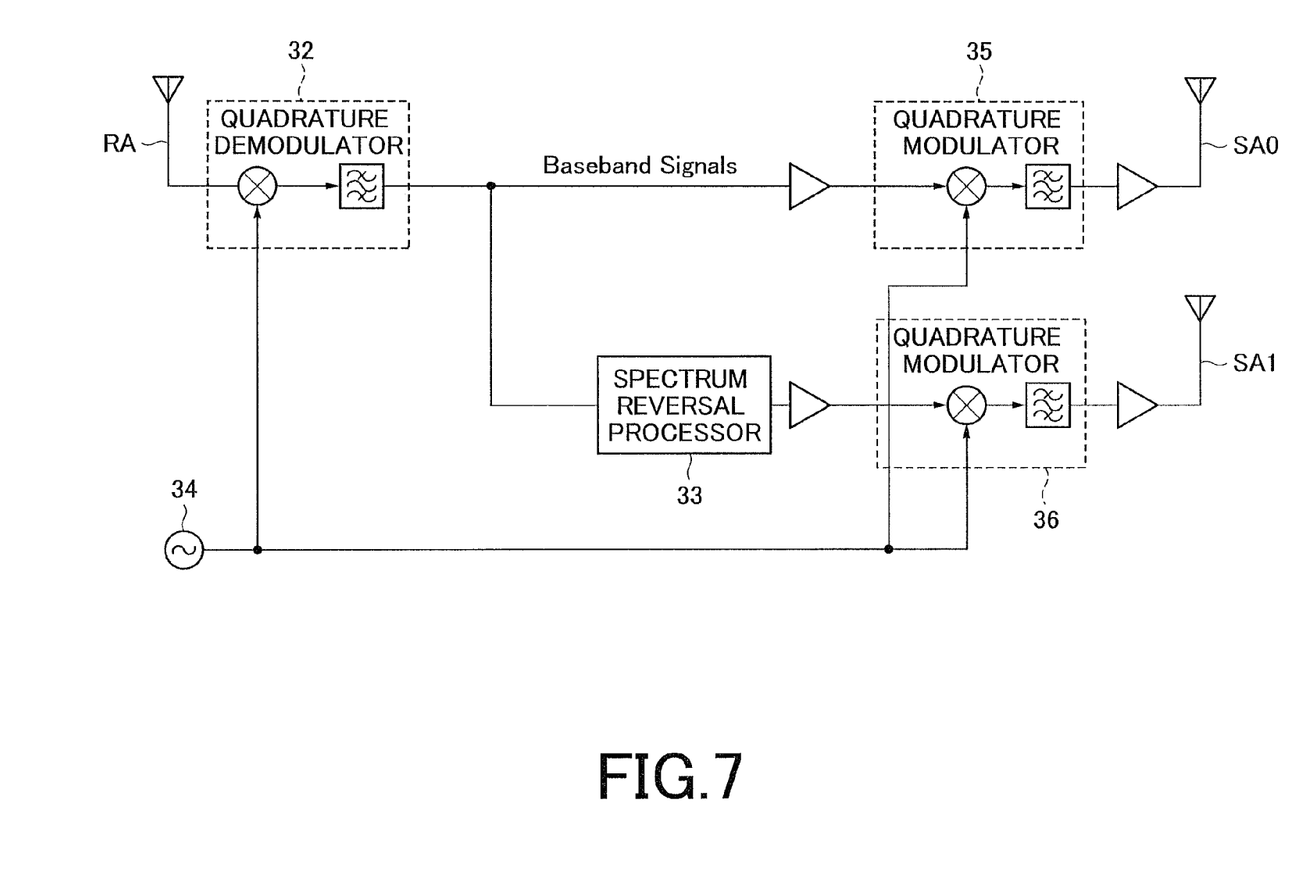
FIG. 7 is a block diagram illustrating a general arrangement of a wireless relay device according to a third embodiment.

FIG. 7 illustrates a general arrangement of the wireless relay device according to the third embodiment. The wireless relay device of FIG. 7 comprises a reception antenna RA, a quadrature demodulator 32, a spectrum reversal processor 33, a local oscillator 34, quadrature modulators 35 and 36, and transmission antennas SA0 and SA1.

Similar to the second embodiment, in the wireless signal transmitted from the base station and received through the reception antenna RA in the third embodiment, the data signals S0 and S1 are respectively allocated to the carriers at the adjacent radio frequencies $F_0$ and $F_1$, and the data signals −S1 and S0 are respectively allocated to the carriers at the radio frequencies $F_n$ and $F_{n-1}$, where the radio frequencies $F_0$ and $F_1$ are located at adjacent positions along the frequency axis, the radio frequencies $F_n$ and $F_{n-1}$ are located at adjacent positions along the frequency axis, and the radio frequencies $F_n$ and $F_{n-1}$ are located at the positions, along the frequency axis, respectively symmetric to the radio frequencies $F_0$ and $F_1$ with respect to a predetermined center frequency (e.g., 2 GHz).

The quadrature demodulator 32 performs quadrature detection on the wireless signal received through the reception antenna RA by using a signal generated by the local oscillator 34, and downconverts the wireless signal into baseband signals (representing the I component and the Q component). The quadrature modulator 35 upconverts the baseband signals into a wireless signal, and then the wireless signal is transmitted through the transmission antenna SA0 to the mobile station. In the wireless signal transmitted through the transmission antenna SA0, the data signals S0 and S1 are respectively allocated to the carriers at the adjacent radio frequencies $F_0$ and $F_1$, and the data signals −S1 and S0 are respectively allocated to the carriers at the radio frequencies $F_n$ and $F_{n-1}$, which are located at the positions, along the frequency axis, respectively symmetric to the radio frequencies $F_0$ and $F_1$ with respect to the predetermined center frequency.

On the other hand, the spectrum reversal processor 33 performs spectrum reversal processing of the baseband signals generated by the quadrature demodulator 32. In the spectrum reversal processing, the polarity of the I component or the Q component is inverted, or the I component and the Q component are exchanged. The quadrature modulator 36 upconverts the spectrum-reversed baseband signals into a wireless signal, and then the wireless signal is transmitted through the transmission antenna SA1 to the mobile station. In the wireless signal transmitted through the transmission antenna SA1, the data signals −S1* and S0* are allocated to the carriers at the radio frequencies $F_0$, and $F_1$, and the data signals S1* and S0* are allocated to the carriers at the radio frequencies $F_n$ and $F_{n-1}$. As mentioned before, the radio frequencies $F_n$ and $F_{n-1}$ are located at the positions, along the frequency axis, respectively symmetric to the radio frequencies $F_0$ and $F_1$ with respect to the predetermined center frequency.

Similar to the second embodiment, in the wireless relay device according to the third embodiment, the wireless relay device generates spectrum-nonreversed signals and spectrum-reversed signals in the identical frequency regions of the baseband signals, and upconverts the spectrum-reversed signals and spectrum-nonreversed signals into the radio frequency bands. Therefore, the transmission diversity using the SFBC encoding is realized in the transmission from the wireless relay device to the receiving station (mobile station) in a similar manner to the second embodiment.

4. Fourth Embodiment

Next, the wireless relay device according to the fourth embodiment of the present invention is explained below with reference to FIG. 8. The wireless relay device according to the fourth embodiment is an adaptation of the wireless relay device according to the first or second embodiment for use of OFDM (orthogonal frequency division multiplexing). The principle of the transmission diversity using SFBC encoding in the fourth embodiment is the same as the first and second embodiments.

Figure 8:
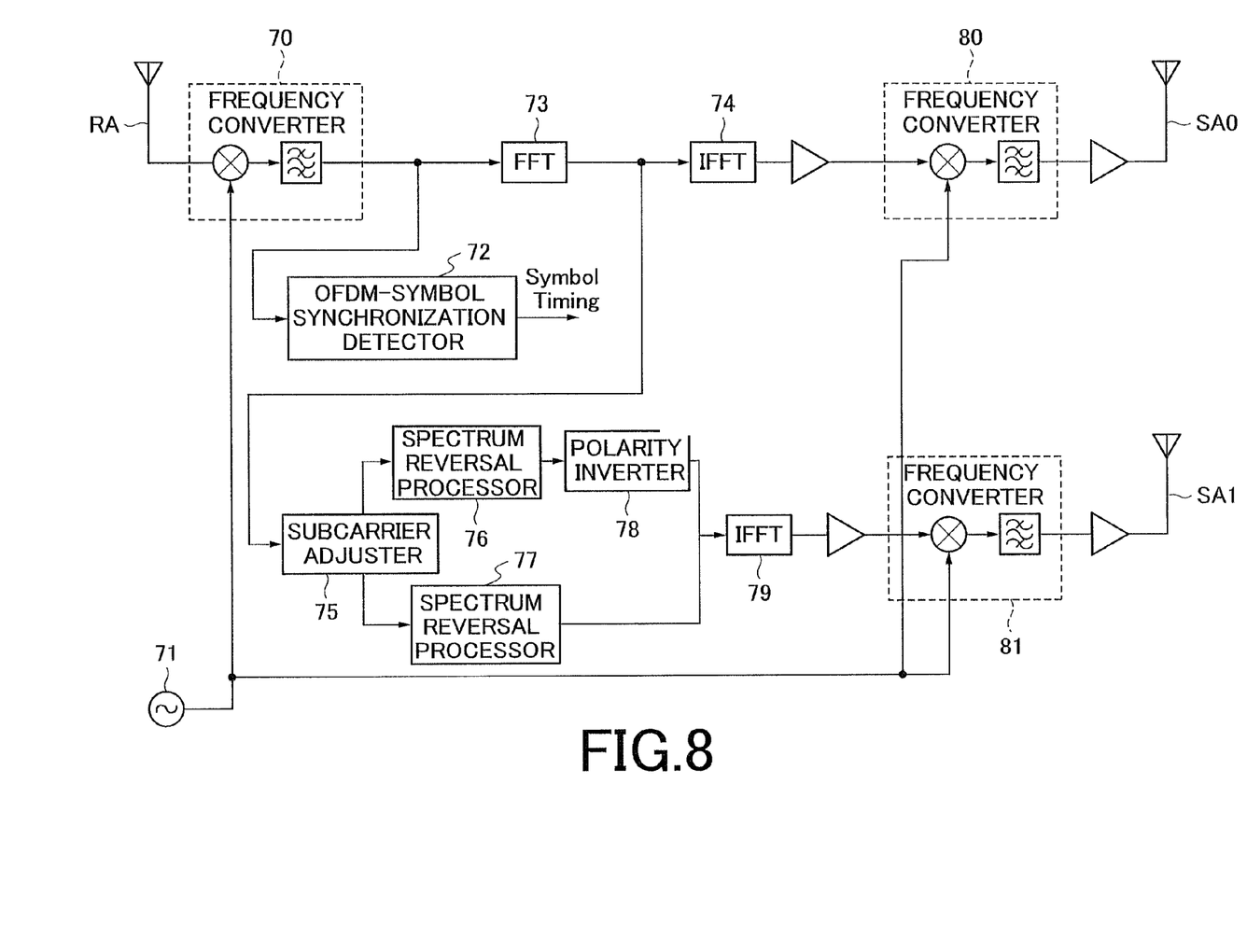
FIG. 8 is a block diagram illustrating a general arrangement of a wireless relay device according to a fourth embodiment.

FIG. 8 illustrates a general arrangement of the wireless relay device according to the fourth embodiment. The wireless relay device of FIG. 8 comprises a reception antenna RA, a frequency converter 70, a local oscillator 71, an OFDM-symbol synchronization detector 72, an FFT (fast Fourier transform) unit 73, an IFFT (inverse fast Fourier transform) units 74 and 79, a subcarrier adjuster 75, spectrum reversal processors 76 and 77, a polarity inverter 78, frequency converters 80 and 81, and transmission antennas SA0 and SA1.

In the wireless relay device of FIG. 8, the frequency converter 70 performs detection on the wireless signal received through the reception antenna RA by using a signal generated by the local oscillator 71, and downconverts the received wireless signal into baseband signals representing a series of detected symbols. The OFDM-symbol synchronization detector 72 detects the symbol timings in the baseband signals. For example, the symbol timings can be detected as follows. That is, the base station transmits a known signal called a preamble in a section leading the series of symbols, and the wireless relay device detects the symbol timings by detecting the correlation between the received preamble and a known preamble.

The FFT unit 73 sets a time window for FFT on the basis of each symbol timing detected by the OFDM-symbol synchronization detector 72, and converts each baseband signal outputted from the frequency converter 70 into a frequency-domain signal corresponding to each OFDM subcarrier, where each baseband signal is assumed to be digitized.

The IFFT unit 74 transforms the frequency-domain signal corresponding to each OFDM subcarrier (obtained by the FFT unit 73) into a time-domain signal, and multiplexes the time-domain signals corresponding to a plurality of OFDM subcarriers. Then, the multiplexed time-domain signals (as baseband signals) are amplified to a desired level, and the frequency converter 80 upconverts the amplified, multiplexed time-domain signals into a wireless signal, which is transmitted to the mobile station through the transmission antenna SA0.

In addition, the frequency-domain signal corresponding to each OFDM subcarrier (obtained by the FFT unit 73) is also inputted into the subcarrier adjuster 75. The subcarrier adjuster 75 exchanges signals allocated to the plurality of OFDM subcarriers for enabling SFBC encoding. For example, in order to realize the SFBC encoding as indicated in FIG. 2, the subcarrier adjuster 75 exchanges signals corresponding to adjacent ones of the OFDM subcarriers (e.g., the data signals S0 and S1 in the example of FIG. 2). Then, the spectrum reversal processors 76 and 77 perform spectrum reversal processing of the exchanged signals. In the example of FIG. 2, the data signals S1* and S0* are generated by the spectrum reversal processing. Further, the polarity inverter 78 inverts the polarity of one of the signals after the exchange and the spectrum reversal processing. In the example of FIG. 2, the data signal −S1* is generated by the polarity inverter 78.

Alternatively, the subcarrier adjuster 75 may perform processing which realizes the SFBC encoding indicated in FIG. 5. The subcarrier adjuster 75 may perform exchange of the data signals corresponding to the OFDM subcarriers in the received wireless signal in the stage in which the data signals are baseband signals. For example, when the frequencies of the baseband signals corresponding to the radio frequencies $F_0$, $F_1$, $F_{n-1}$, and $F_n$ of the OFDM subcarriers in the received wireless signal are respectively denoted by $f_0$, $f_1$, $f_{n-1}$, and $f_n$, exchange is performed between the data signals corresponding to the frequencies $f_0$ and $f_n$, and between the data signals corresponding to the frequencies $f_1$ and $f_{n-1}$. That is, the exchange is performed between the data signals corresponding to the frequencies located at symmetric positions along the frequency axis with respect to the center frequency.

After the desired complex conjugate signals are allocated to the OFDM subcarriers, the IFFT unit 79 transforms the frequency-domain signals into time-domain signals, and multiplexes the time-domain signals. Then, the multiplexed time-domain signals (as baseband signals) are amplified to a desired level, and the frequency converter 81 upconverts the amplified, multiplexed time-domain signals into a wireless signal, which is transmitted to the mobile station through the transmission antenna SA1.

5. Variations

Although the embodiments of the present invention are explained in detail as above, various changes and modifications of each of the embodiments can be made within the scope of the present invention. Hereinbelow, variations of the wireless relay devices according to some of the embodiments which are made for improving the precision in the signal processing performed in the wireless relay devices.

5.1 First Variation

The wireless relay device as a first variation is explained below with reference to FIG. 9, which illustrates a general arrangement of the wireless relay device as a variation of the second embodiment. The wireless relay device of FIG. 9 comprises an arrangement for adjustment of the frequencies of the local oscillators, in addition to the arrangement of the wireless relay device of FIG. 6. However, variations similar to the first variation explained below may also be applied to the other embodiments.

Figure 9:
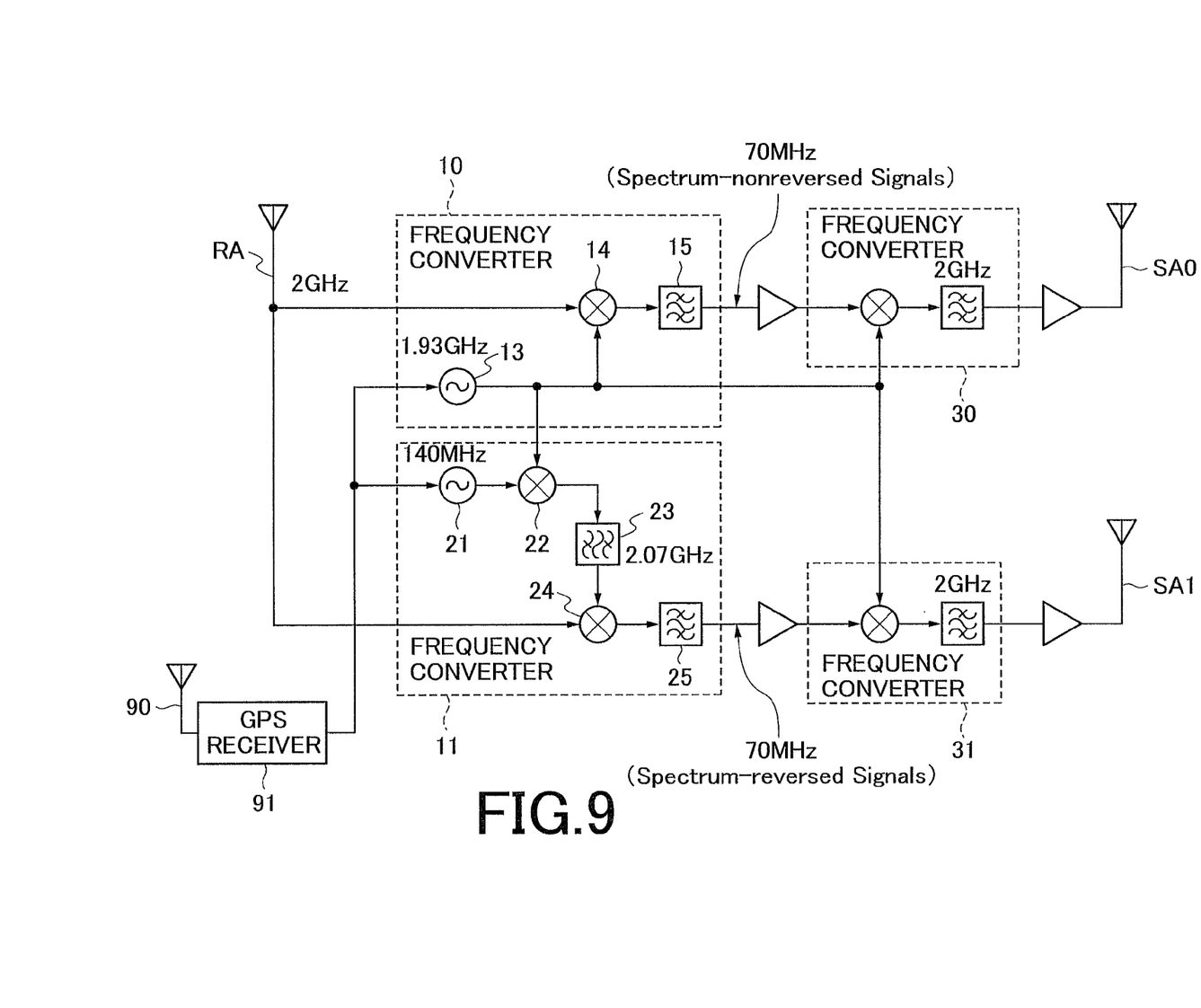
FIG. 9 is a block diagram illustrating a general arrangement of a wireless relay device as a variation of the second embodiment.

The wireless relay device of FIG. 9 comprises a GPS (global positioning system) antenna 90 and a GPS receiver 91, in addition to the constituent elements of the wireless relay device of FIG. 6. The GPS antenna 90 receives from a GPS satellite a reference signal at predetermined intervals. The GPS receiver 91 inputs into the local oscillators 13 and 21 the reference signal received by the GPS antenna 90, so that each of the local oscillators operates in synchronization with the reference signal. Further, although not shown, an oscillator in the base station as a transmitting station is also synchronized with the reference signal received from the GPS satellite. In the base station configured as above, the precision in the frequency of the wireless signal transmitted from the base station is improved. In addition, in the wireless relay device configured as above, the precision in the frequencies of the signals generated by the local oscillators in the wireless relay device of FIG. 9 is also improved. Therefore, the precision in the frequencies of the signals generated in the wireless relay device of FIG. 9 (e.g., the spectrum-reversed signals and the spectrum-nonreversed signals in the 70 MHz band, and the corresponding wireless signals in the example of FIG. 6) is improved.

5.2 Second Variation

The wireless relay device as a second variation is explained below with reference to FIG. 10, which illustrates a general arrangement of the wireless relay device as a variation of the third embodiment. The wireless relay device of FIG. 10 comprises an arrangement for correction of an error in the frequency of the local oscillator, in addition to the arrangement of the wireless relay device of FIG. 7. However, variations similar to the second variation explained below may also be applied to the other embodiments.

Figure 10:
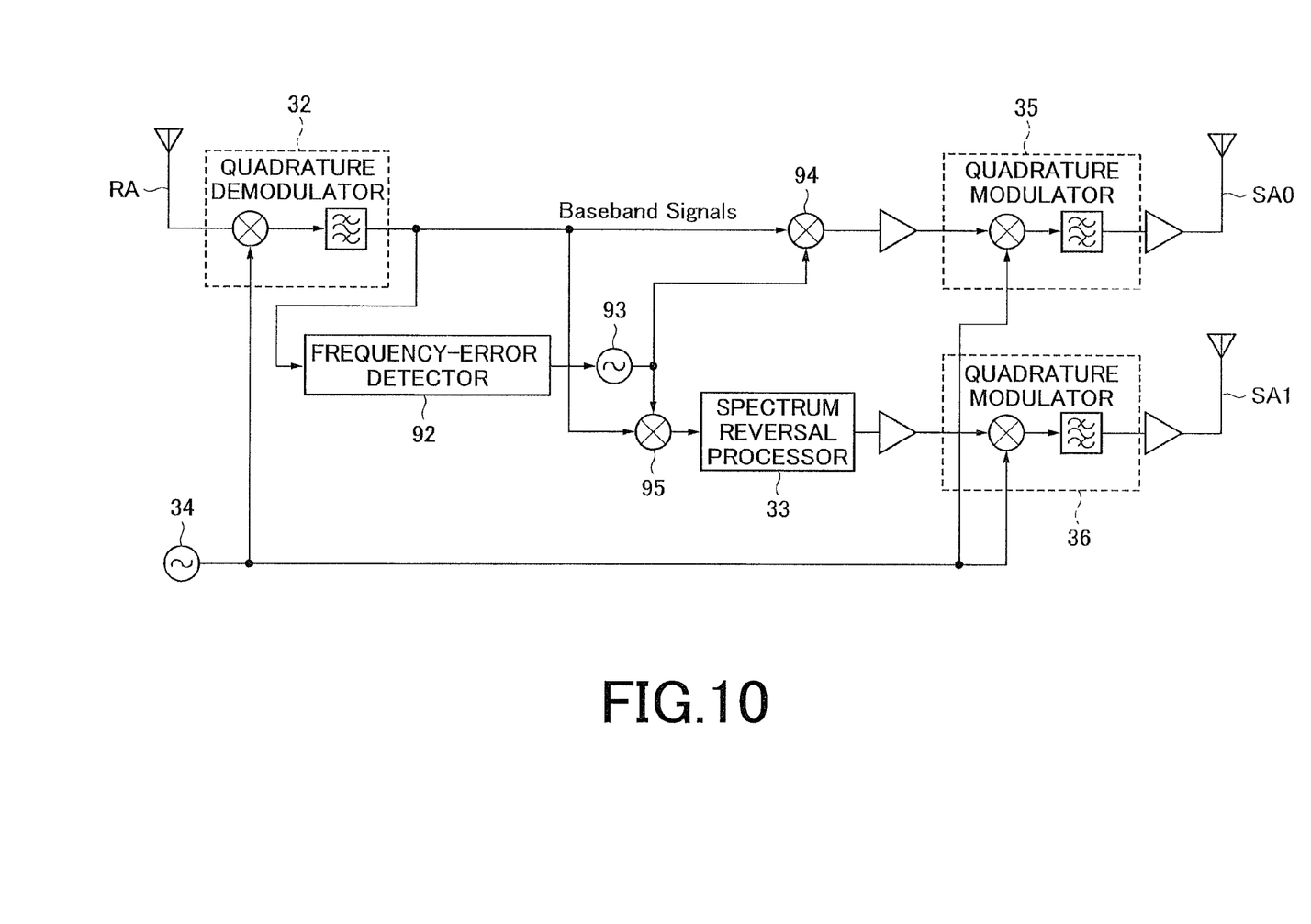
FIG. 10 is a block diagram illustrating a general arrangement of a wireless relay device as a variation of the third embodiment.

The wireless relay device of FIG. 10 comprises a frequency-error detector 92, a local oscillator 93, and mixers 94 and 95, in addition to the constituent elements of the wireless relay device of FIG. 7. The frequency-error detector 92 detects an error in the frequencies of the baseband signals generated by the quadrature demodulator 32. Although the manner of detection of the frequency error is not specifically limited, for example, the frequency error can be detected by differentiating variations in the phase of a known reference signal received from the base station. The reference signal is, for example, a pilot signal or a preamble signal. The local oscillator 93 generates a signal having a frequency corresponding to the frequency error detected by the frequency-error detector 92, and supplies the generated signal to the mixers 94 and 95. The frequency error in the baseband signals outputted from the quadrature demodulator 32 can be corrected with the outputs of the mixers 94 and 95.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless relay device for relaying wireless signals from a transmitting station to a receiving station, comprising:
   a reception antenna which receives from the transmitting station a wireless signal that contains first and second wireless signal components in which a first data signal and a second data signal are respectively allocated to a carrier at a first radio frequency and a carrier at a second radio frequency adjacent to the first radio frequency along the frequency axis;
   a first transmission antenna;
   a second transmission antenna; and
   an encoder which generates first and second spectrum-reversed signals, the power spectra of which are symmetric respectively to those of the first and second data signals along the frequency axis, and allocates a plurality of signals among the first data signal, the second data signal, the first and second spectrum-reversed signals, and polarity-inverted signals of the first and second spectrum-reversed signals to carriers at adjacent radio frequencies along the frequency axis so that space frequency block coding is applied using the first transmission antenna and the second transmission antenna.

2. The wireless relay device according to claim 1, wherein the wireless signal is transmitted from the transmitting station to the receiving station in accordance with an orthogonal frequency division multiplexing (OFDM) system, the first data signal and the second data signal are respectively allocated to adjacent OFDM subcarriers, and the encoder further exchanges the first data signal and the second data signal which are allocated to the adjacent OFDM subcarriers.

3. The wireless relay device according to claim 1, further comprising an arrangement for detecting a frequency error on the basis of a known reference signal contained in the wireless signal received from the transmitting station, and correcting frequencies of baseband signals obtained from the wireless signal.

4. A wireless relay device for relaying wireless signals from a transmitting station to a receiving station, comprising:
   a reception antenna which receives from the transmitting station a wireless signal that contains:
      first and second wireless signal components in which a first data signal and a second data signal are respectively allocated to a carrier at a first radio frequency and a carrier at a second radio frequency adjacent to the first radio frequency along the frequency axis;
      a third wireless signal component in which a third data signal as a polarity-inverted signal of the second data signal is allocated to a carrier at a third radio frequency located at a position symmetric to the first radio frequency along the frequency axis with respect to a predetermined center frequency; and
      a fourth wireless signal component in which a fourth data signal identical to the first data signal is allocated to a carrier at a fourth radio frequency located at a position symmetric to the second radio frequency along the frequency axis with respect to the predetermined center frequency;
   a first transmission antenna;
   a second transmission antenna; and
   an encoder which generates first, second, third, and fourth spectrum-reversed signals, the power spectra of which are symmetric respectively to those of the first, second, third, and fourth data signals along the frequency axis, and allocates each of the first, second, third and fourth spectrum-reversed signals to a carrier at a radio frequency located at a position symmetric, along the frequency axis with respect to the predetermined center frequency, to a radio frequency to which a data signal corresponding to the each of the first, second, third and fourth spectrum-reversed signals is allocated in the received wireless signal so that space frequency block coding is applied using the first transmission antenna and the second transmission antenna.

5. The wireless relay device according to claim 4, further comprising:
   a first frequency converter which performs detection on the received wireless signal by using a fifth radio frequency lower than the predetermined center frequency, and generates spectrum-nonreversed signals at a frequency corresponding to a difference between the predetermined center frequency and the fifth radio frequency;
   a second frequency converter which performs detection on the received wireless signal by using a sixth radio frequency higher than the predetermined center frequency by the difference, and generates spectrum-reversed signals at the frequency identical to the spectrum-nonreversed signals;
   a third frequency converter which converts the spectrum-nonreversed signals into a wireless signal to be transmitted through the first transmission antenna, by using a signal at the fifth radio frequency; and
   a fourth frequency converter which converts the spectrum-reversed signals into a wireless signal to be transmitted through the second transmission antenna, by using a signal at the fifth radio frequency.

6. The wireless relay device according to claim 4, wherein the wireless signal is transmitted from the transmitting station to the receiving station in accordance with an orthogonal frequency division multiplexing (OFDM) system, the first data signal, the second data signal, the third data signal, and the fourth data signal respectively correspond to OFDM subcarriers, and the encoder further exchanges ones of the first data signal, the second data signal, the third data signal, and the fourth data signal allocated to ones of the OFDM subcarriers at radio frequencies located at positions, along the frequency axis, symmetric to each other with respect to the predetermined center frequency.

7. The wireless relay device according to claim 4, further comprising one or more local oscillators each of which operates in synchronization with a reference signal obtained from a global positioning system (GPS).

8. A wireless relay method for relaying wireless signals from a transmitting station to a receiving station, comprising:
   receiving, from the transmitting station through a reception antenna, a wireless signal that contains first and second wireless signal components in which a first data signal and a second data signal are respectively allocated to a carrier at a first radio frequency and a carrier at a second radio frequency adjacent to the first radio frequency along the frequency axis;
   generating first and second spectrum-reversed signals, the power spectra of which are symmetric respectively to those of the first and second data signals along the frequency axis;
   allocating a plurality of signals among the first data signal, the second data signal, the first and second spectrum-reversed signals, and polarity-inverted signals of the first and second spectrum-reversed signals to carriers at adjacent radio frequencies along the frequency axis; and
   transmitting the carriers to which the plurality of signals are allocated, through the first transmission antenna and the second transmission antenna, so that space frequency block coding is applied using the first transmission antenna and the second transmission antenna.

\* \* \* \* \*